United States Patent
Lota

(10) Patent No.: US 7,500,703 B2
(45) Date of Patent: Mar. 10, 2009

(54) SOFT EDGE INSERT

(75) Inventor: Charan S. Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 34 days.

(21) Appl. No.: 11/671,826

(22) Filed: Feb. 6, 2007

(65) Prior Publication Data

US 2008/0185859 A1  Aug. 7, 2008

(51) Int. Cl.
*B60R 13/00* (2006.01)

(52) U.S. Cl. .................................... 296/1.08

(58) Field of Classification Search ............... 296/1.08, 296/214, 191, 39.1
See application file for complete search history.

(56) References Cited

U.S. PATENT DOCUMENTS

| | | | | |
|---|---|---|---|---|
| 4,840,832 A | * | 6/1989 | Weinle et al. | 428/156 |
| 4,844,533 A | * | 7/1989 | Dowd et al. | 296/214 |
| 4,892,770 A | | 1/1990 | Labrie | |
| 4,893,867 A | * | 1/1990 | Hilborn et al. | 296/214 |
| 5,061,002 A | | 10/1991 | Saso et al. | |
| 5,190,314 A | | 3/1993 | Takasugi | |
| 5,331,525 A | * | 7/1994 | Lawassani et al. | 362/140 |
| 5,688,022 A | * | 11/1997 | Adams et al. | 296/214 |
| 5,825,096 A | * | 10/1998 | Morimoto et al. | 307/9.1 |
| 5,893,603 A | * | 4/1999 | Viertel et al. | 296/214 |
| 6,582,013 B1 | * | 6/2003 | Inoue et al. | 296/214 |
| 6,749,079 B2 | | 6/2004 | Katagiri et al. | |
| 6,761,388 B2 | | 7/2004 | Lein et al. | |
| 6,802,550 B1 | | 10/2004 | Griggs, Jr. et al. | |
| 7,077,468 B2 | | 7/2006 | Maierholzner et al. | |
| 2005/0116490 A1 | | 6/2005 | Sitzler et al. | |
| 2005/0140157 A1 | | 6/2005 | Emerling | |
| 2005/0218681 A1 | | 10/2005 | DePue et al. | |
| 2008/0073924 A1 | * | 3/2008 | Sakamoto | 296/1.08 |
| 2008/0100100 A1 | * | 5/2008 | Huisman | 296/215 |
| 2008/0122266 A1 | * | 5/2008 | Benkler et al. | 296/214 |

FOREIGN PATENT DOCUMENTS

| | | | | |
|---|---|---|---|---|
| EP | 347149 A2 | * | 12/1989 | |
| EP | 440836 A1 | * | 8/1991 | |
| JP | 55008937 A | * | 1/1980 | 296/214 |
| JP | 55008938 A | * | 1/1980 | 296/214 |
| JP | 02179562 A | * | 7/1990 | 296/39.1 |
| JP | 05270319 | | 10/1993 | |
| JP | 06032177 | | 2/1994 | |

* cited by examiner

*Primary Examiner*—H Gutman
(74) *Attorney, Agent, or Firm*—Gifford, Krass, Sprinkle, Anderson & Citkowski, P.C.

(57) ABSTRACT

A trim assembly for use in an interior of an automotive vehicle includes a substrate and a flexible insert. The substrate has a peripheral edge, an end wall and a side wall. The end wall protrudes from the peripheral edge of the substrate. The side wall extends from the peripheral edge. The side wall is generally orthogonal relative to the end wall and spaced apart from the peripheral edge to define a retaining portion. The flexible insert has a groove for receiving the end wall therein to retain the insert along a first axis relative to the substrate. The insert further has a finger that extends into the retaining portion to retain the insert along a second axis relative to the substrate, wherein the second axis is generally orthogonal to the first axis. The retaining portion also retains the finger along a third axis generally orthogonal to both the first and second axes.

12 Claims, 2 Drawing Sheets

SOFT EDGE INSERT

FIELD OF THE INVENTION

The invention relates to a rubber insert for use with interior components of a vehicle. More particularly, the invention relates to a rubber insert that is secured along a peripheral edge of an interior component having a soft outer surface.

BACKGROUND OF THE INVENTION

Automotive vehicles include interior trim parts that provide interior surfaces that are aesthetically pleasing and also soft to touch. A trim part typically includes a dimensionally stable molded substrate that provides the overall shape of the part and a trimmed pad coupled to an outer surface of the substrate to provide a soft, padded surface. Conventional trim parts, however, are also typically wrapped in vinyl, rubber or other similar materials, which results in hard edges that are unpleasant to touch. Thus, it remains desirable to provide an improved trim part design with edges that are soft and generally continuous with the soft, padded surface.

SUMMARY OF THE INVENTION

According to one aspect of the invention, a trim assembly is provided for use in an interior of an automotive vehicle. The trim assembly includes a substrate and a flexible insert. The substrate has a peripheral edge, an end wall and a side wall. The end wall protrudes from the peripheral edge of the substrate. The side wall extends from the peripheral edge. The side wall is generally orthogonal relative to the end wall and spaced apart from the peripheral edge to define a retaining portion. The flexible insert has a groove for receiving the end wall therein to retain the insert along a first axis relative to the substrate. The insert further has a finger that extends into the retaining portion to retain the insert along a second axis relative to the substrate, wherein the second axis is generally orthogonal to the first axis.

According to another aspect of the invention, a trim assembly is provided for use in an interior of an automotive vehicle. The trim assembly includes a flexible insert and a substrate. The flexible insert has a longitudinally extending groove formed along a main body thereof. The insert further has a finger spaced apart from the main body to define a second groove that is generally orthogonal relative to the longitudinally extending groove. The substrate has a peripheral edge. The substrate has an end wall that protrudes from the peripheral edge for insertion into the longitudinally extending groove to constrain the insert relative to the substrate along a first axis. The substrate further has a box-shaped retaining portion that receives the finger therein to constrain the insert relative to the substrate along second and third axes.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
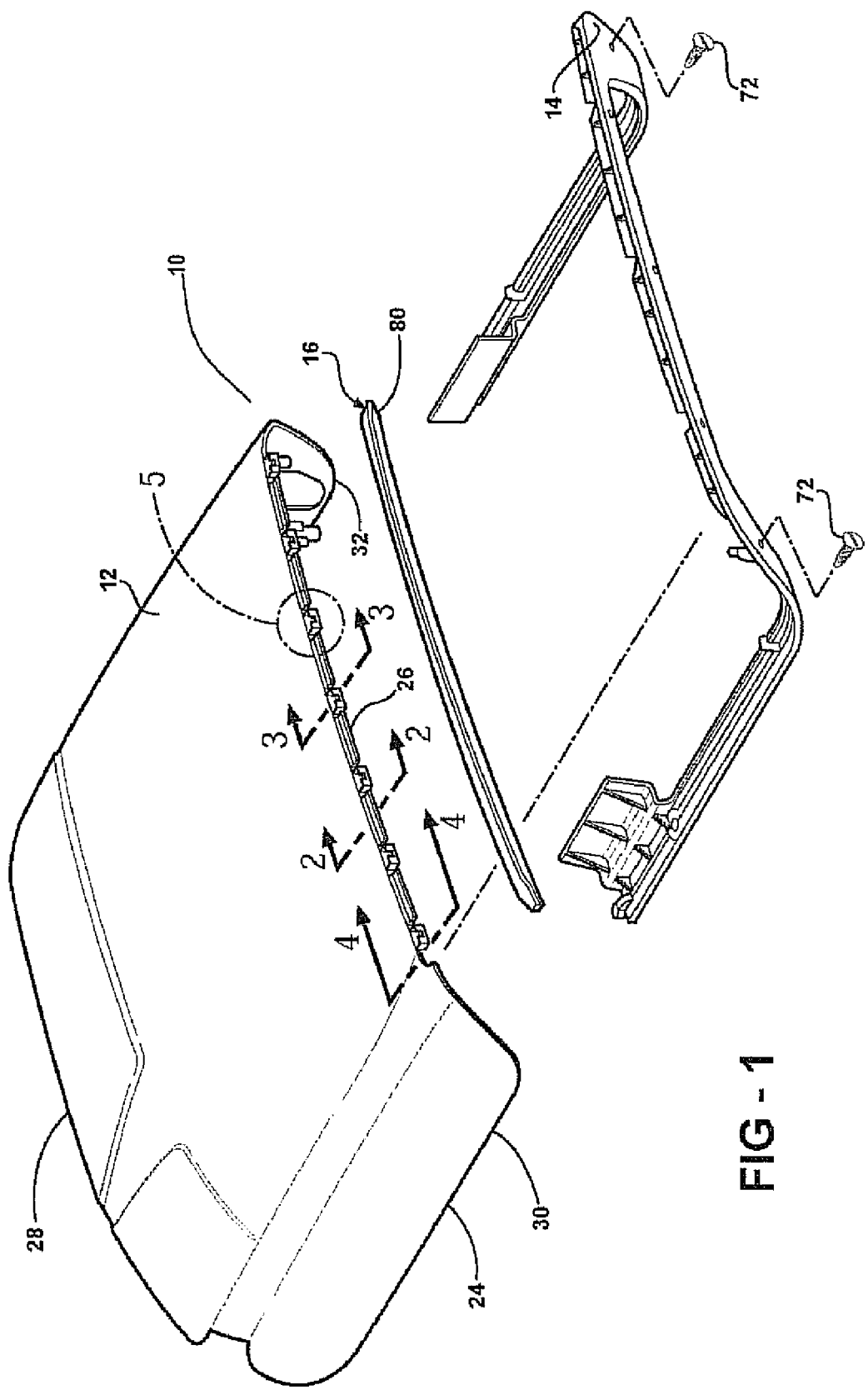
FIG. 1 is an exploded perspective view of trim assembly according to one embodiment of the invention.
Figure 2:
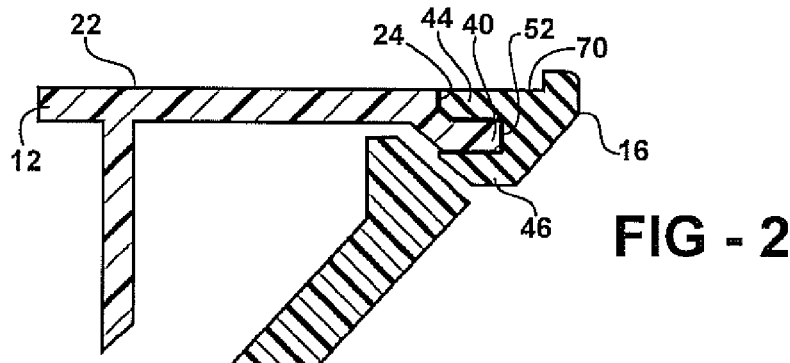
FIG. 2 is a cross sectional view of the trim assembly, as indicated at 2-2 in FIG. 1.

Referring to FIGS. 1 and 2, an interior trim assembly for an automotive vehicle is generally indicated at 10. The trim assembly 10 includes a substrate 12, a bezel 14 and a flexible insert 16.

The substrate 12 is dimensionally stable and provides the overall shape of the trim assembly 10. The substrate 12 includes an outer surface 22 defined by a peripheral edge 24. The peripheral edge 24 has a front end 26, a back end 28 and opposite sides 30, 32 of the substrate 12.

An end wall 40 protrudes from the peripheral edge 24 of the substrate 12. An arm 46 and an upper wall 44 extend from a main body 48 of the insert 16 toward the peripheral edge 24 of the substrate 12. The arm 46 and upper wall 44 are spaced apart to define a groove 52. The end wall 40 extends into the groove 52 to constrain the insert 16 relative to the substrate 12 along a first axis.

Figure 3:
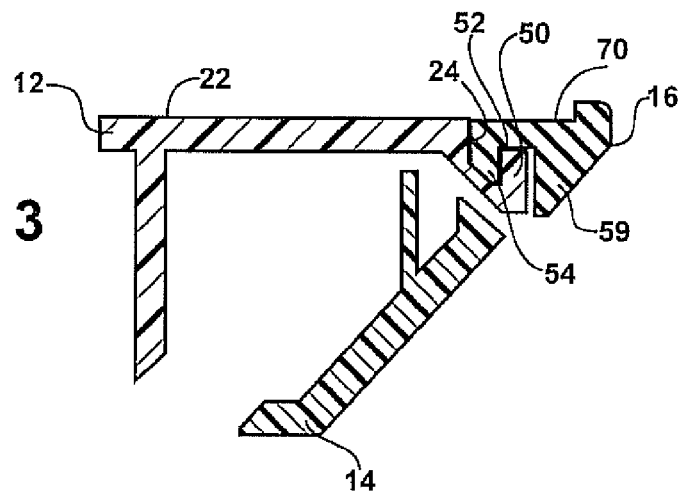
FIG. 3 is a cross sectional view of the trim assembly, as indicated at 3-3 in FIG. 1.
Figure 5:
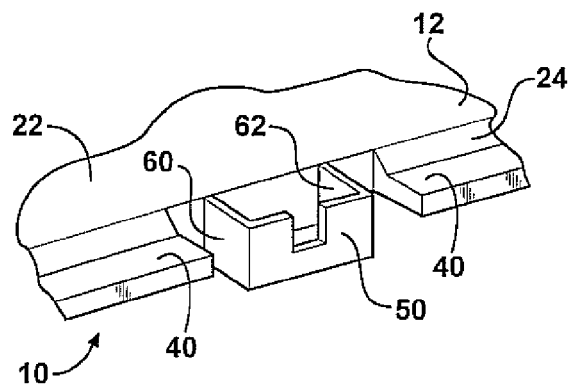
FIG. 5 is an enlarged perspective view of a retaining portion formed on an insert of the trim assembly.

Referring to FIGS. 3 and 5, the substrate 12 includes a retaining portion 59 having a side wall 50 and a pair of end stop 60, 62. The side wall 50 is generally parallel and spaced apart from the peripheral edge 24. The end stops 60, 62 are spaced apart from each other and extend between the peripheral edge 24 and the side wall 50 to form the open ended box.

The insert 16 includes a finger 54 that protrudes outwardly from the upper wall 44. The finger 54 is generally orthogonal to the arm 46 and extends into the retaining portion 59. The finger 54 is constrained along a second axis between the peripheral edge 24 and the side wall 50 and along a third axis between the end stops 60, 62.

Figure 4:
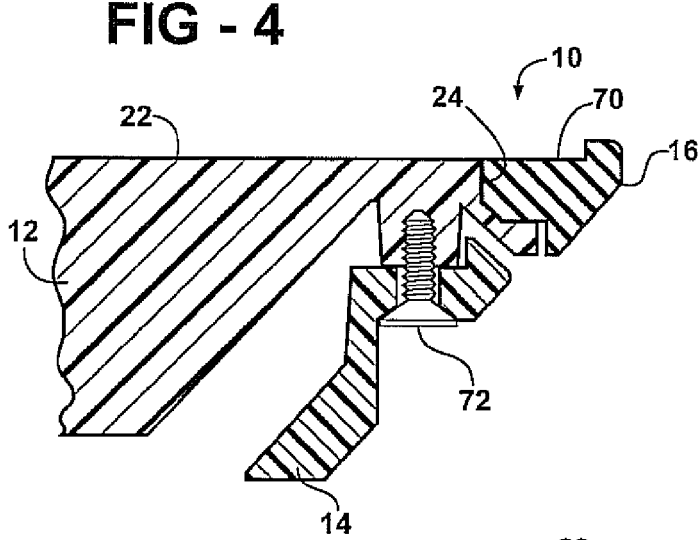
FIG. 4 is a cross sectional view of the trim assembly, as indicated at 4-4 in FIG. 1.

The bezel 14 is fixedly secured to the substrate 12 by a fastener 72, which is shown illustratively in FIGS. 1 and 4 as a screw. Other conventional fasteners, such as integrally molded tabs or push pins may be used for securing the bezel 14 to the substrate 12. The bezel 14 provides an overall finished appearance to the peripheral edge 24 of the substrate 12.

In assembly, the insert 16 is pressed onto the peripheral edge 24 of the substrate 12. More specifically, the end wall 40 is inserted into the groove 52 to retain the insert 16 relative to the substrate 12 along a first axis. The finger 54 is inserted into the retaining portion 59 between the peripheral edge 24 and the side wall 50 to retain the insert 16 relative to the substrate 12 along a second axis. The finger 54 also extends between the end stops 60, 62 of the retaining portion 59 to retain the insert 16 relative to the substrate 12 along a third axis. The bezel 14 is then fixedly secured to the substrate 12 by the fastener 72.

By this arrangement, outer surfaces 22 and 70 of the substrate 12 and insert 16 are substantially flush to allow a wrap (not shown) to be positioned thereon. The edges of the wrap would be concealed by an upstanding lip 80 of the insert 16, thereby concealing the edge of the wrap and providing a substantially continuous soft surface therewith.

The invention has been described in an illustrative manner. It is, therefore, to be understood that the terminology used is intended to be in the nature of words of description rather than of limitation. Many modifications and variations of the invention are possible in light of The above teachings. For example, in The illustrated embodiment, the insert extends along the front end of the substrate. The insert may also extend along the sides or the entire peripheral edge. Thus, within the scope of the appended claims, the invention may be practiced other than as specifically described.

I claim:

1. A trim assembly for use in an interior of an automotive vehicle, said trim assembly comprising:

a substrate having a peripheral edge, the substrate having an end wall that protrudes from the peripheral edge of the substrate, the substrate further having a side wall extending from the peripheral edge, the side wall being generally orthogonal relative to the end wall and spaced apart from the peripheral edge to define a retaining portion;

a flexible insert having a groove for receiving the end wall therein to retain the insert along a first axis relative to the substrate, the insert further having a finger that extends into the retaining portion to retain the insert along a second axis relative to the substrate, wherein the second axis is generally orthogonal to the first axis.

2. A trim assembly as set forth in claim 1, wherein the insert includes a longitudinally extending main body, the insert further having an upper wall and an arm that extend outwardly from the main body, the upper wall and arm being generally parallel and spaced apart to define the groove.

3. A trim assembly as set forth in claim 2, wherein the finger extends from a distal end of the upper wall and is spaced apart from the main body to receive the side wall.

4. A trim assembly as set forth in claim 3, wherein the retaining portion includes a pair of end stops that extend between the peripheral edge and the side wall, the end stops being spaced apart to retain the finger there-between along a third axis relative to the substrate, wherein the third axis is generally orthogonal to both the first and second axes.

5. A trim assembly as set forth in claim 1, wherein the substrate and the insert have substantially flush outer surfaces.

6. A trim assembly as set forth in claim 5, wherein the insert includes an upstanding lip that protrudes from the outer surface of the insert.

7. A trim assembly for use in an interior of an automotive vehicle, said trim assembly comprising:

a flexible insert having a longitudinally extending groove formed along a main body thereof, the insert further having a finger spaced apart from the main body to define a second groove generally orthogonal relative to the longitudinally extending groove; and a substrate having a peripheral edge, the substrate having an end wall that protrudes from the peripheral edge for insertion into the longitudinally extending groove to constrain the insert relative to the substrate along a first axis, the substrate having a box-shaped retaining portion that receives the finger therein to constrain the insert relative to the substrate along second and third axes.

8. A trim assembly as set forth in claim 7, wherein the retaining portion includes a side wall spaced apart from the peripheral edge of the substrate to receive the finger there-between, the side wall being generally orthogonal relative to the end wall.

9. A trim assembly as set forth in claim 8, wherein the retaining portion includes a pair of end stops extending between the peripheral edge and the side wall, the end stops being spaced apart to retain the finger there-between.

10. A trim assembly as set forth in claim 7 including a plurality of end walls and a plurality of retaining portions that are arranged in an alternating manner along the peripheral edge of the substrate.

11. A trim assembly as set forth in claim 7, wherein the substrate and the insert have substantially flush outer surfaces.

12. A trim assembly as set forth in claim 11, wherein the insert includes an upstanding lip that protrudes from the outer surface of the insert.

* * * * *

UNITED STATES PATENT AND TRADEMARK OFFICE
CERTIFICATE OF CORRECTION

PATENT NO. : 7,500,703 B2  Page 1 of 1
APPLICATION NO. : 11/671826
DATED : March 10, 2009
INVENTOR(S) : Charan Singh Lota It is certified that error appears in the above-identified patent and that said Letters Patent is hereby corrected as shown below:

Column 2, line 65, replace "The" with --the--

Column 2, line 66, replace "The" with --the--

Signed and Sealed this

Twenty-sixth Day of May, 2009

JOHN DOLL
*Acting Director of the United States Patent and Trademark Office*